June 1, 1926.

J. H. WILSON 1,587,453

SELF PROPELLED WINCH

Original Filed Feb. 29, 1924    2 Sheets-Sheet 1

Inventor
John Hart Wilson,
By Watson, Coit, Morse & Linden
Attorney

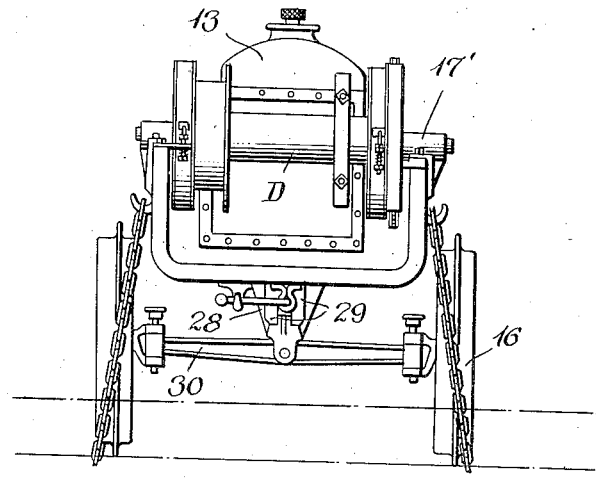
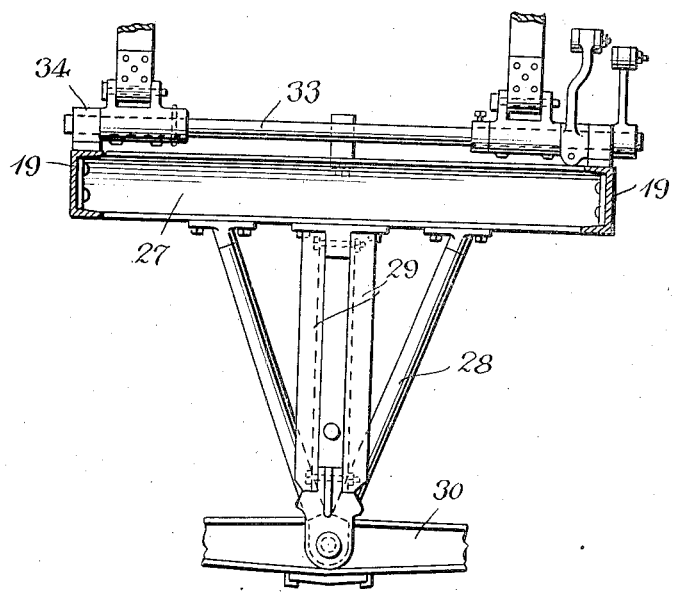

Patented June 1, 1926.

1,587,453

UNITED STATES PATENT OFFICE.

JOHN HART WILSON, OF BURKBURNETT, TEXAS.

SELF-PROPELLED WINCH.

Original application filed February 29, 1924, Serial No. 696,037. Divided and this application filed May 28, 1924. Serial No. 716,480.

The present invention relates to winches, particularly to self-propelled winches used in oil field operations in raising from and lowering into oil wells, tools, tubing, rods and other implements.

In Patent No. 1,499,045 granted to me June 24, 1924, a self-propelled winch is illustrated and described having a number of features of novelty, in which patent however only the underframe construction is claimed. The present application is a division of the application which matured into the patent above mentioned and the general construction of the framework of the tractor is hereinafter claimed, that is, the framework by means of which the forward end of the engine casing, the winch, the control mechanism, and the power transmission mechanism between the tractor and the winch are supported. This frame mechanism is of novel character and is designed particularly to support a winch in advance of the engine casing in a sturdy manner, a novel system of bracing and frame construction being provided so that the combined tractor and winch satisfactorily resists all strains incident to rapid travel over rough ground. The winch drum is supported in a most convenient position and the frame work is designed to produce maximium strength for minimum weight of metal and expense in fabrication.

It will be understood that that form which is illustrated in the accompanying drawings and herein described is given by way of example only, and that the design and arrangement of the component elements may be greatly modified without departing from its spirit and scope.

In the drawings:

Figure 3 is a front elevation of the improved winch;

Figure 4 is a section on line 4—4 of Figure 1.

Figure 1:
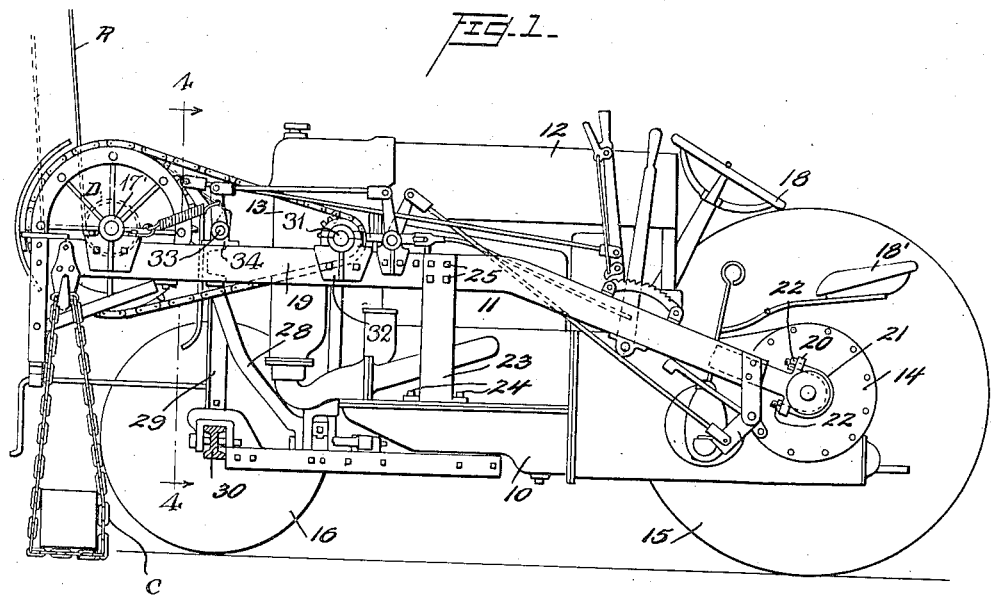
Figure 1 is a side elevation of the improved winch, one front and one rear wheel being removed however, so that the framework and moving parts may be more clearly observed.
Figure 2:
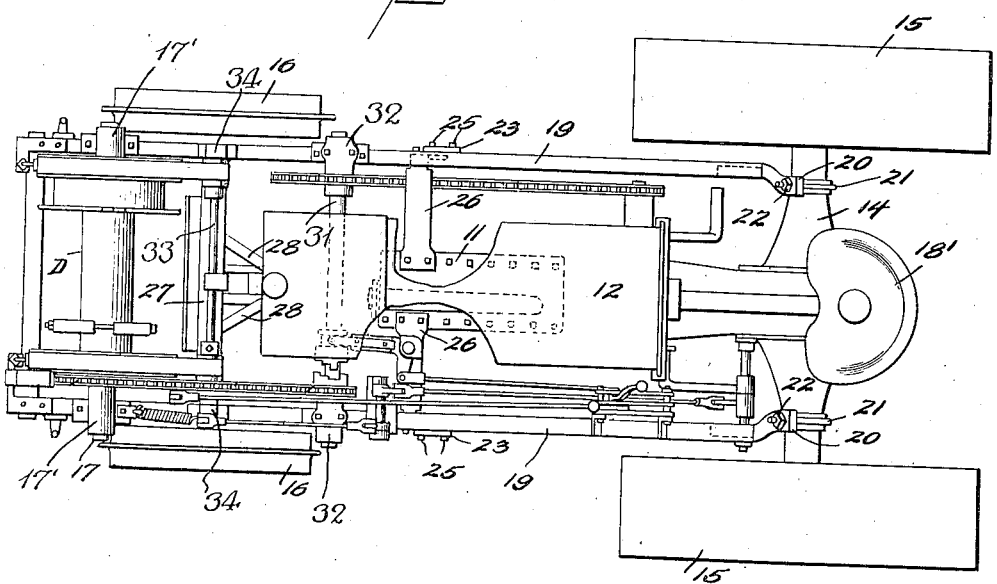
Figure 2 is a top plan view of the same, part being broken away.

The tractor illustrated in the drawings is the well-known Fordson tractor, and the advantages of adapting this tractor for the purposes intended, from the standpoint of economy and simplicity of construction, will be apparent to those skilled in the art. As before pointed out, however, the invention is limited to no particular form of tractor, and, while in the embodiment herein disclosed it is particularly adapted to a wheeled tractor, many of its features may be incorporated if desired in a tractor of the belt tread type.

The crank case of the tractor is indicated at 10, its engine block at 11, fuel oil tank at 12, radiator at 13, rear axle housing at 14, rear wheels at 15 and front wheels at 16. The driver's seat is indicated at 18' and the steering wheel at 18. A number of the other features of the tractor have been omitted from the drawings for the sake of clearness. The winch drum is indicated at D, and the axle upon which this drum is non-rotatably secured is indicated at 17. This axle extends transversely of the tractor, and its ends are supported in babbitt lined bearings 17', which are mounted upon horizontally extending side frame members 19. These side frame members are, in the particular embodiment illustrated, formed of channel irons with their flat faces outward, and the bearings 17' are secured by suitable bolts to these channel irons, certain of the bolts passing through the top flanges of the channels, and certain other bolts passing through the webs of the channels.

The side frame members 19 project for a considerable distance in advance of the tractor, and the forward portions of these members are horizontally disposed, while the rearward portions are downwardly and rearwardly inclined, as shown clearly in Figure 1. The rear and lower ends of the side frames are provided with inwardly offset portions or feet 20 which rest on prepared seats on the rear axle housing, and these feet 20 are securely retained in this position by U-shaped double ended bolts 21 provided with nuts 22. At their mid points, the side frame members are supported by inclined upright braces 23, the lower ends of which are bolted to the crank case flange by bolts 24, and the upper ends to the webs of the side frame members by bolts 25.

Laterally extending tying-in members 26 secure the top flanges on the side frame members to the head of the cylinder block to prevent lateral spreading of these members. In addition, the side frame members are connected by a transversely extending channel member 27 in advance of the radiator 13. A V-shaped brace 28, clearly shown in Figure 4, has its upper ends secured to the bottom flange of the cross channel 27 and extends downwardly and rearwardly and has its lower end rigidly supported in a manner hereinafter to be more fully described. This brace 28, supplemented by a vertically extending brace, comprising angle irons 29 having their upper ends secured to cross channel 27, and their lower ends supported from the axle 30 in a manner hereinafter to be more fully described, supports the forwardly extending portions of the side frame members 19 and transmits the weight of the drum and its associated mechanism to the frame and wheels. It will thus be seen that a simple and light frame mechanism is provided for supporting the winding drum, yet which frame is braced securely against all possible strains which may be imposed upon it. This frame, in addition to supporting the winding drum, supports the brake mechanism, the counter shaft and other members of the control mechanism.

The winch operating mechanism, which will not be hereinafter described in detail inasmuch as it is fully described in my Patent No. 1,499,045, includes a counter shaft 31 rotatably mounted in bearings 32 rigidly supported upon the side frame members respectively, this shaft being disposed transverse to the longitudinal axis of the tractor and being positioned immediately in rear of the radiator. A second shaft 33 in advance of the radiator is rotatably mounted in bearings 34 rigidly secured to the side frame members, this second shaft being a portion of the brake mechanism for controlling the movements of the drum. These shafts not only comprise essential elements of the winch drum operating mechanism, but they also assist somewhat in maintaining the rigidity of the frame as the tractor passes over rough ground. The frame is of course designed to remain rigid under all conditions of operation and the counter shafts are not essential in maintaining such rigidity. At the same time, however, they obviously tend to promote rigidity when mounted as shown in the drawings.

The means for connecting the front axle 30 to the bottom of the engine casing, and the means for connecting the bottom of the V-shape member 28 to the engine casing have been set forth in detail in my patent, previously referred to and it is not necessary to repeat this description.

The winch is particularly adapted in oil field operations and especially for raising and lowering rods, tools and implements of all kinds into and out of oil wells, and in performing these functions, the rope or cable wound on the drum is carried upwardly to a pulley at or toward the top of an oil derrick and thence vertically downwardly into the well. The pull of the cable, indicated at R in Figure 1 is thus in a nearly vertical direction. A chain indicated at C prevents lifting of the front end of the winch when pull is exerted by the cable.

As previously pointed out, the principles of the invention may be carried out in different ways, and the self-propelled winch above described and illustrated in the accompanying drawings, is given by way of example only. The design and arrangement of the component elements of the invention may be varied and modified considerably without departing from the spirit and scope of the invention.

Having thus described my invention what I claim as new and desire to be secured by Letters Patent is:

1. A tractor including in combination, an engine casing, a rear axle and traction wheels to support the rear end of the engine casing, a front axle in advance of the engine casing, wheels on said front axle, substantially parallel side frame members, one on each side of the engine casing, extending forwardly from the rear axle to overlie the front axle, means for supporting the forward ends of said members from the front axle, and means for bracing the front axle from the engine casing said means being secured to the bottom of the engine casing and to the axle.

2. A tractor including in combination, an engine casing, a rear axle and traction wheels to support the rear end of the engine casing, a front axle in advance of the engine casing, wheels on said front axle, substantially parallel side frame members, one on each side of the engine casing, extending forwardly from the rear axle to overlie the front axle, means for supporting the forward ends of said members from the front axle, and means for bracing the front axle from the engine casing said means comprising a member having its rear end secured to the bottom of the engine casing and its forward end pivotally connected to the axle centrally thereof.

3. A tractor including in combination, an engine casing, a rear axle and wheels to support the rear end of the engine casing, a front axle in advance of the engine casing, wheels on said front axle, substantially parallel side frame members extending forwardly from the rear axle to overlie the front axle, there being one of said members on each side of the engine casing, the rear end of each side member being secured to the rear axle and said members being inclined forwardly and upwardly from said rear axle to a point approximately midway of the length of the tractor, and thence horizontally to their front ends, means for supporting the front ends of said members from the front axle, and means connecting said members to the engine casing intermediate the front and rear axles.

5. A tractor comprising an engine casing, a rear axle and wheels to support the rear end of said casing, a front axle in advance of the engine casing, wheels on said front axle, substantially parallel side frame members having elevated horizontally disposed forward portions for supporting a winch in advance of the engine casing and downwardly and rearwardly inclined rear portions, means for securing said rear portions to the rear axle, means to support the forward portions from the front axle, and additional means connecting the said side members and the forward end of the engine casing.

5. A tractor comprising an engine casing, a rear axle and wheels to support the rear end of the casing, a front axle in advance of the engine casing, wheels on said axle, and means for supporting the front end of the casing and a winch, from the front axle, said means including longitudinally extending side frame members, one on each side of the engine casing, the rear end of each side frame member being secured to the rear axle and the front ends of said members extending over the front axle at an elevation higher than either of said axles, and means connecting the front axle and side members and the side members and the front end of the engine casing, whereby the side members are supported from the front axle and the front end of the engine is supported from the side members.

6. A tractor comprising in combination, an engine casing, a rear axle and traction wheels to support the rear end of the engine casing, a front axle in advance of the engine casing, wheels on said front axle, substantially parallel side frame members, one on each side of the engine casing, extending forwardly from the rear axle to overlie the front axle, means for supporting the forward ends of said members from the front axle, and braces connecting the said side frame members to the engine casing including a substantially horizontal brace for securing each side member to the top of the engine casing.

7. A tractor comprising in combination, an engine casing, a rear axle and traction wheels to support the rear end of the engine casing, a front axle in advance of the engine casing, wheels on said front axle substantially parallel side frame members, one on each side of the engine casing extending forwardly from the rear axle to overlie the front axle, means for supporting the forward ends of said members from the front axle, and braces connecting the said side frame members to the engine casing including an inclined brace extending downwardly and inwardly from each side member to the engine casing.

8. A tractor comprising in combination, an engine casing, a rear axle and traction wheels to support the rear end of the engine casing, a front axle in advance of the engine casing, wheels on said front axle substantially parallel side frame members, one on each side of the engine casing extending forwardly from the rear axle to overlie the front axle, means for supporting the forward ends of said members from the front axle, and braces connecting said side frame members to the engine casing including upwardly and forwardly inclined brace means extending from the bottom of the engine casing to the level of the side frame members, said brace means being so connected to both side frame members so as to transmit forces between the engine casing and side frame members.

9. A tractor comprising in combination, an engine casing, a rear axle and traction wheels to support the rear end of the engine casing, a front axle in advance of the engine casing, wheels on said front axle, substantially parallel side frame members, one on each side of the engine casing extending forwardly from the rear axle to overlie the front axle, means for supporting the forward ends of said members from the front axle, and braces connecting the said side frame members to the engine casing including an upwardly and forwardly inclined V-shaped brace member having its lower end connected to the bottom of the engine casing and its upper ends so connected to the side frame members as to transmit forces between the engine casing and side frame members.

10. A tractor comprising in combination, an engine casing, a rear axle and traction wheels to support the rear end of the engine casing, a front axle in advance of the engine casing, wheels on said front axle substantially parallel side frame members, one on each side of the engine casing extending forwardly from the rear axle to overlie the front axle, means for supporting the forward ends of said members from the front axle, and braces connecting the said side frame members to the engine casing including a horizontal and a laterally inclined brace connecting each side frame member to the engine casing.

11. A tractor comprising in combination, an engine casing, a rear axle and traction wheels to support the rear end of the engine casing, a front axle in advance of the engine casing, wheels on said front axle substantially parallel side frame members, one on each side of the engine casing extending forwardly from the rear axle to overlie the front axle, means for supporting the forward ends of said members from the front axle, and braces connecting the said side frame members to the engine casing including a horizontal and a laterally inclined brace connecting each side frame member to the engine casing, and means including forwardly inclined brace means connecting the bottom of the casing to both side members.

12. A tractor comprising in combination, an engine casing, a rear axle and traction wheels to support the rear end of the engine casing, a front axle in advance of the engine casing, wheels on said front axle substantially parallel side frame members, one on each side of the engine casing extending forwardly from the rear axle to overlie the front axle, means for supporting the forward ends of said members from the front axle, and braces connecting the said side frame members to the engine casing including a horizontal cross member connecting the said side frame members in advance of the engine casing, and inclined brace means directly secured to said cross member and the bottom of the casing.

In testimony whereof I hereunto affix my signature.

JOHN HART WILSON.